(12) United States Patent
Yang et al.

(10) Patent No.: US 8,387,107 B2
(45) Date of Patent: Feb. 26, 2013

(54) METHOD, SYSTEM AND DEVICE FOR PROCESSING MEDIA STREAM

(75) Inventors: Peilin Yang, Nanjing (CN); Hui Huang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/340,256

(22) Filed: Dec. 29, 2011

(65) Prior Publication Data

US 2012/0102517 A1  Apr. 26, 2012

Related U.S. Application Data

(63) Continuation of application No. PCT/CN2010/073690, filed on Jun. 9, 2010.

(30) Foreign Application Priority Data

Jun. 30, 2009 (CN) .......................... 2009 1 0150050

(51) Int. Cl.
*H04N 7/16* (2011.01)

(52) U.S. Cl. ........ 725/151; 725/152; 725/131; 725/132; 725/139; 725/140; 725/94

(58) Field of Classification Search .................... 725/94, 725/131–132, 139–140, 151–152
See application file for complete search history.

(56) References Cited

U.S. PATENT DOCUMENTS

| 2002/0013949 | A1* | 1/2002 | Hejna, Jr. ...................... 725/100 |
| 2005/0081244 | A1 | 4/2005 | Barrett et al. |
| 2006/0222323 | A1 | 10/2006 | Sharpe et al. |
| 2008/0022320 | A1 | 1/2008 | Ver Steeg |
| 2008/0062990 | A1 | 3/2008 | Oran |
| 2008/0192839 | A1 | 8/2008 | Gahm et al. |
| 2009/0025027 | A1* | 1/2009 | Craner ........................... 725/32 |
| 2009/0064242 | A1 | 3/2009 | Cohen et al. |

FOREIGN PATENT DOCUMENTS

| CN | 1689327 A | 10/2005 |
| CN | 101072359 A | 11/2007 |
| CN | 101588494 A | 11/2009 |
| EP | 1523190 A1 | 4/2005 |
| EP | 1708506 A2 | 10/2006 |

OTHER PUBLICATIONS

Extended European Search Report dated Oct. 30, 2012 in connection with European Patent Application No. 10793548.8, 6 pages.
Written Opinion of the International Searching Autchority dated Sep. 16, 2010 in connection with International Patent Application No. PCT/CN2010/073690.
International Search Report dated Sep. 16, 2010 in connection with International Patent Application No. PCT/CN2010/073690.

* cited by examiner

*Primary Examiner* — Nicholas Corbo

(57) ABSTRACT

A media stream processing method, a communication system, and a relevant device are disclosed, so as to improve the user experience. The method includes the following steps: a first media receiving device receives media streams, where the media streams include a first media stream and a second media stream; and the first media receiving device processes the first media stream quickly and plays the second media stream normally so that media play progress of the first media receiving device is synchronous with media play progress of the second media receiving device, where the second media receiving device is configured to receive multicast media streams, and the first media receiving device and the second media receiving device are in the same multicast group. A communication system and a relevant device are also disclosed herein. In this way, the user experience is improved.

8 Claims, 5 Drawing Sheets

METHOD, SYSTEM AND DEVICE FOR PROCESSING MEDIA STREAM

CROSS-REFERENCE TO RELATED APPLICATIONS

This application is a continuation of International Application No. PCT/CN2010/073690, filed on Jun. 9, 1010, which claims priority to Chinese Patent Application No. 200910150050.7, filed on Jun. 30, 2009, both of which are hereby incorporated by reference in their entireties.

TECHNICAL FIELD

The present invention relates to the field of communication, and in particular, to a method, system and device for processing media stream processing.

BACKGROUND

With the development of the multicast technology, media streams are usually transmitted in multicast mode in a point-to-multipoint media stream transmission system. For example, the multicast technology is widely applied in the media services such as Internet Protocol Television (IPTV), web TV, mobile TV, and Digital Television (DTV).

The original video streams are oversized and inconvenient for being transmitted over the network, so the media stream transmission systems generally compress the original video streams before the transmission. The conventional video coding and compression technology works in an intraframe compression mode and an interframe compression mode to compress the original video streams significantly. However, the decoding and the play of most video frames depend on intraframe-coded frames. In other words, the media receiving device is unable to decode or play videos after the media receiving device receives interframe-coded frames but receives no intraframe-coded frame.

When the media streams are sent in multicast mode, if a new media receiving device joins a multicast group, the new media receiving device cannot play videos until it receives intraframe-coded frames of the media streams in the multicast group. Consequently, the new media receiving device that joins the multicast group may need to wait for a long time before it is able to play videos.

In order that a new media receiving device in a multicast group may start playing videos as soon as practicable, a method for sending media streams quickly in the prior art is follows: After a target media receiving device joins the multicast group, media streams are sent to the target media receiving device from the intraframe-coded frame in a current Group of Pictures (GOP) quickly. In this way, the target media receiving device may start playing videos soon. When the progress of the quickly sent media streams coincides with the progress of the normal multicast media streams, the network side starts sending the normal multicast media streams to the target media receiving device.

However, the target media receiving device joins the multicast group halfway, so the network side sends the media streams from the intraframe-coded frame in the GOP when sending the media streams to the target media receiving device, and the sending speed is higher than the speed of sending the normal multicast media streams. Therefore, the data in the video buffer of the target media receiving device is more than the data in the video buffer of the original media receiving device that receives the normal multicast media streams. When the target media receiving device plays videos at the same speed as the original media receiving device, the real-time content played by the target media receiving device is always later than the content played by the original media receiving device because the video buffer of the target media receiving device stores more data, which affects the user experience.

SUMMARY

Embodiments of the present invention provide a media stream processing method, a communication system, and a relevant device to improve the user experience.

A media stream processing method provided in an embodiment of the present invention includes:

receiving, by a first media receiving device, media streams, where the media streams include a first media stream and a second media stream; and processing, by the first media receiving device, the first media stream quickly and playing the second media stream normally so that media play progress of the first media receiving device is synchronous with media play progress of a second media receiving device, where the second media receiving device is configured to receive multicast media streams, and the first media receiving device and the second media receiving device are in the same multicast group.

A communication system provided in an embodiment of the present invention includes:

a server, configured to provide media streams;

a first media receiving device, configured to: receive the media streams from the server, where the media streams include a first media stream and a second media stream; and process the first media stream quickly and play the second media stream normally so that media play progress of the first media receiving device is synchronous with media play progress of a second media receiving device; and the second media receiving device, configured to receive multicast media streams, where the first media receiving device and the second media receiving device are in the same multicast group.

A media receiving device provided in an embodiment of the present invention includes:

a receiving unit, configured to receive media streams, where the media streams include a first media stream and a second media stream; and a processing unit, configured to process the first media stream quickly and play the second media stream normally so that media play progress of itself is synchronous with media play progress of a second media receiving device, where the second media receiving device is configured to receive multicast media streams, and the media receiving device and the second media receiving device are in the same multicast group.

The embodiments of the present invention bring at least the following benefits:

In the embodiments of the present invention, the first media receiving device receives media streams and processes the first media stream quickly so that the media play progress of the first media receiving device is synchronous with the media play progress of the second media receiving device in the same multicast group, where the second media receiving device is currently receiving multicast media streams normally in multicast mode. Therefore, after the first media receiving device joins the multicast group halfway, although the video buffer of the first media receiving device stores more data than the video buffer of other media receiving devices in the multicast group, the play progress of the first media receiving device may catch up with the play progress of other media receiving devices in the multicast group because the first media receiving device processes the surplus data quickly according to quick processing indication information. As a result, all the media receiving devices in the same multicast group play the real-time content synchronously, thereby improving the user experience.

DETAILED DESCRIPTION

The embodiments of the present invention provide a media stream processing method, a communication system, and the relevant device to improve the user experience.

Figure 1:
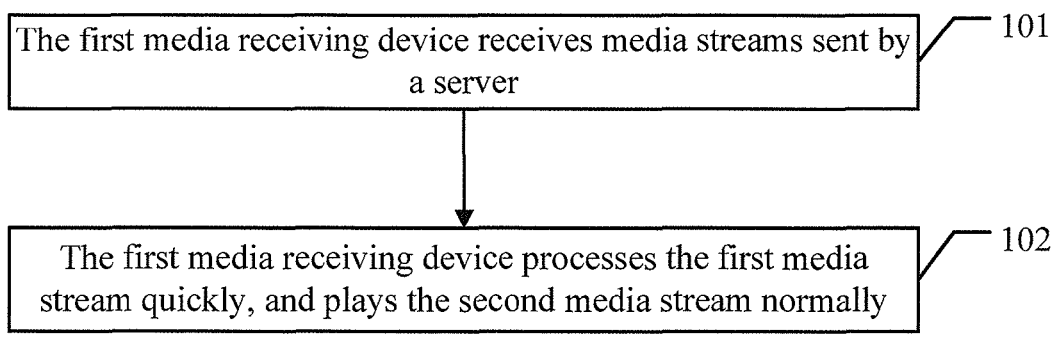
FIG. 1 is a schematic diagram of a media stream processing method according to an embodiment of the present invention.

As shown in FIG. 1, a media stream processing method provided in an embodiment of the present invention includes the following steps:

101: A first media receiving device receives media streams.

In this embodiment, when the first media receiving device requests to join a multicast group, the time point when the first media receiving device requests for joining may be not the time point of sending the intraframe-coded frame in the multicast media stream in the multicast group, so the first media receiving device may be unable to start playing the media streams immediately. In order that the first media receiving device may play media streams as soon as practicable, the server or another intermediate device sends media streams to the first media receiving device from the intraframe-coded frame in the current GOP quickly. In this way, the first media receiving device may start playing videos soon.

Upon completion of sending the media streams quickly, the server or the other intermediate device may send the multicast media streams to the first media receiving device at the normal sending speed.

In this embodiment, the media streams sent by the server or other intermediate device to the first media receiving device may be regarded as two parts: the first media stream and the second media stream. The first media stream needs to be processed by the first media receiving device quickly, and the second media stream needs to be played by the first media receiving device normally. The length of the first media stream depends on the play delay of the first media receiving device.

102: The first media receiving device processes the first media stream quickly, and plays the second media stream normally.

After receiving the media streams, the first media receiving device processes the first media stream quickly and plays the second media stream normally so that media play progress of the first media receiving device is synchronous with media play progress of the second media receiving device in this multicast group as soon as practicable.

The second media receiving device is configured to receive multicast media streams, and the first media receiving device and the second media receiving device are in the same multicast group.

It should be noted that, in this embodiment, the second media receiving device may be a user equipment (UE) or network device. The UE and network device are configured to receive the multicast media streams in the multicast group.

When the first media receiving device is a UE that joins the multicast group first, the second media receiving device is a network device that receives multicast media streams. The play progress synchronous between the first media receiving device and the network device refers to synchronous play progress between the first media receiving device and the UE virtually connected to the network device.

When the first media receiving device is not the UE that joins the multicast group first, the second media receiving device is a UE that has joined the multicast group and is receiving the multicast media streams.

In this embodiment, the first media receiving device receives media streams from the server and processes the first media stream quickly so that the media play progress of the first media receiving device is synchronous with the media play progress of the second media receiving device in the same multicast group, where the second media receiving device is receiving multicast media streams. Therefore, after the first media receiving device joins the multicast group halfway, although the video buffer of the first media receiving device stores more data than the video buffer of other media receiving devices in the multicast group, the play progress of the first media receiving device may catch up with the play progress of other media receiving devices in the multicast group because the first media receiving device processes the surplus data quickly according to quick processing indication information. As a result, all the media receiving devices in the same multicast group play the real-time content synchronously, thereby improving the user experience.

In this embodiment, the first media receiving device may process the first media stream quickly in different modes. For example, the first media receiving device may obtain quick processing indication information, and process the first media stream quickly in the received media streams according to the quick processing indication information, where the quick processing indication information may be obtained locally from the first media receiving device or obtained from the network side.

Figure 2:
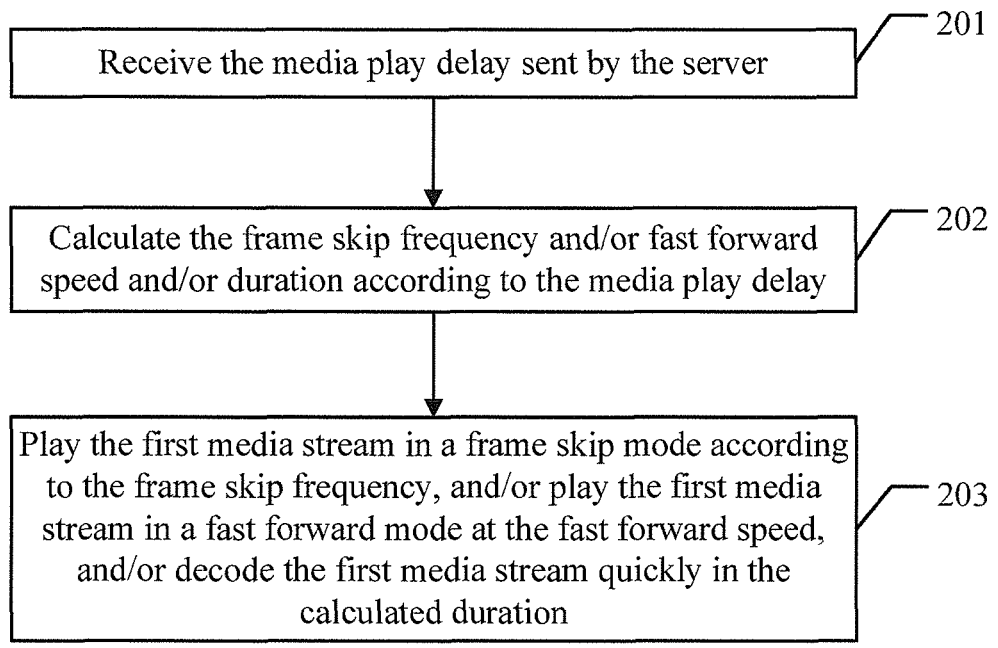
FIG. 2 is a schematic diagram of a media stream processing method according to another embodiment of the present invention.

For ease of understanding, the following describes the media stream processing method in detail. Referring to FIG. 2, another embodiment of the media stream processing method includes the following steps:

201: The first media receiving device receives a media play delay sent by a server.

In this embodiment, when the first media receiving device requests to join a multicast group, the time point when the first media receiving device requests for joining may be not the time point of sending the intraframe-coded frame in the multicast media stream in the multicast group, and the first media receiving device may be unable to start playing the media streams immediately. In order that the first media receiving device may play media streams as soon as practicable, the server sends media streams to the first media receiving device from the intraframe-coded frame in the current GOP quickly. In this way, the first media receiving device may start playing videos soon.

This embodiment assumes that the media streams are received from the server. In practice, the first media receiving device may receive the media streams from another network element such as an intermediate device, and the mode of receiving the media streams for the first media receiving device is not limited.

Upon completion of sending the media streams quickly, the server may send the multicast media streams to the first media receiving device at the normal sending speed.

In this embodiment, the media streams sent by the server to the first media receiving device may be regarded as two parts: the first media stream and the second media stream. The first media stream needs to be processed by the first media receiving device quickly, and the second media stream needs to be played by the first media receiving device normally.

The first media stream may include the media stream sent by the server quickly, or include the media stream sent by the server quickly and a media stream of a preset length in the media streams sent by the server normally. The length of the first media stream depends on the play delay of the first media receiving device.

In this embodiment, the quick sending mode may be unicast quick sending or multicast quick sending, which is not limited herein.

Because the server sends media streams to the first media receiving device quickly, in order to synchronize the play progress of the first media receiving device with the play progress of the second media receiving device in this multicast group as soon as practicable, the first media receiving device may obtain quick processing indication information. In this embodiment, the quick processing indication information is obtained by the first media receiving device from the server, and the quick processing indication information is a media play delay.

The media play delay is a frame difference or time difference between the following two time points: the time point when the server sends an intraframe-coded frame in a current GOP to the first media receiving device, and the time point of sending the intraframe-coded frame in the current GOP in the multicast media streams; or the media play delay is the sum of the difference and an inherent play delay. In practice, the intraframe-coded frame may be Instantaneous Decoding Refresh (IDR) frame.

Figure 3:
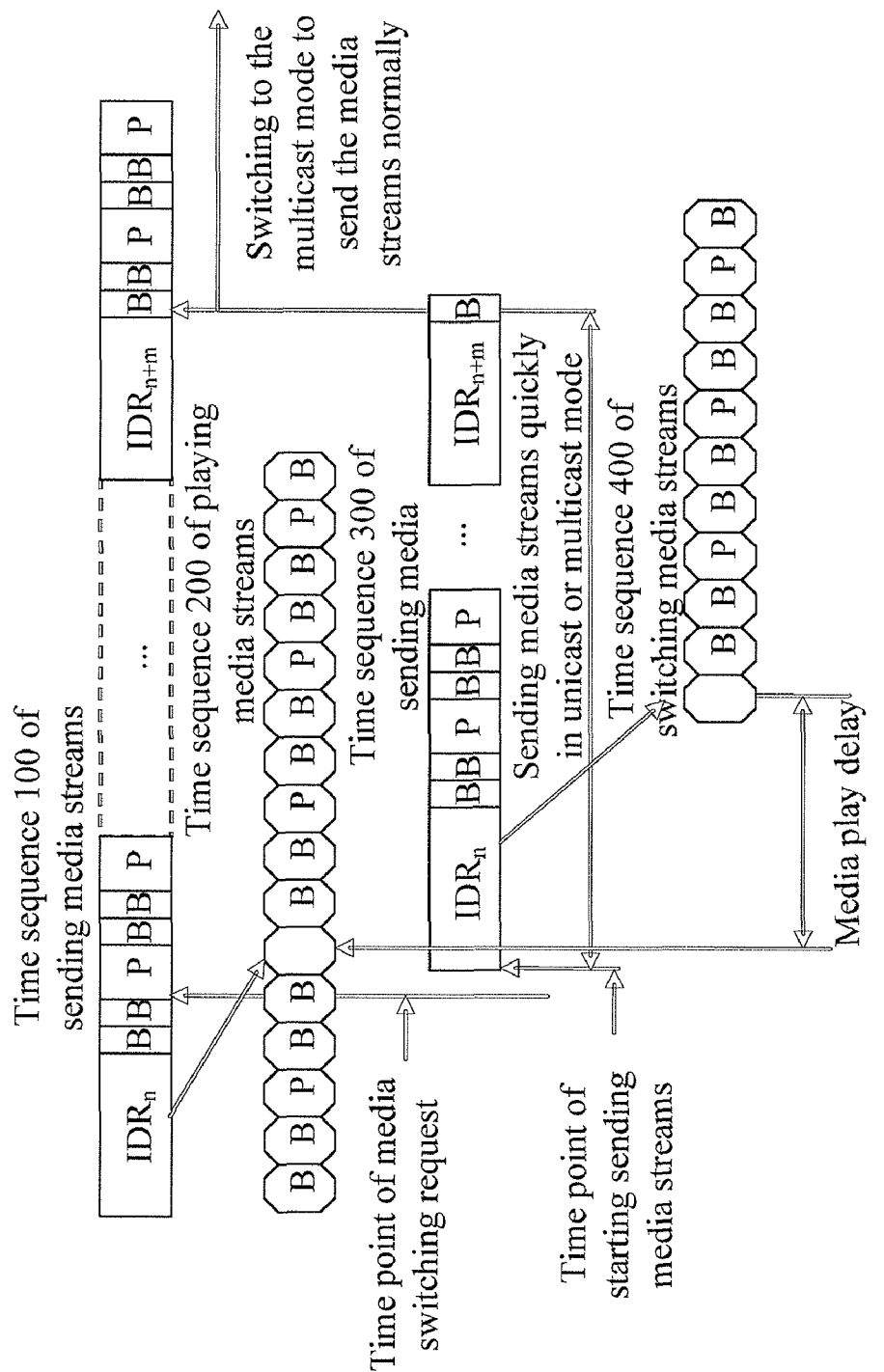
FIG. 3 is a schematic diagram of a media stream sending process according to an embodiment of the present invention.

Refer to FIG. 3 for ease of understanding. In FIG. 3, a sequence 100 is a time sequence for the second media receiving device to receive media streams from the server, and a sequence 200 is a time sequence for the second media receiving device to decode and display the received media streams.

When the first media receiving device joins the multicast group (or requests for media stream switching), a sequence 300 is the time sequence for the first media receiving device to receive the switched media stream, and is sent from the intraframe-coded frame of the current GOP; and a sequence 400 is the time sequence for the first media receiving device to decode and display the received media streams of the sequence 300.

It can be seen from FIG. 3 that, when the first media receiving device joins the multicast group (or requests for media switching), an obvious "media play delay" exists between the first media receiving device and the second media receiving device. This delay depends on the size of the GOP and the switching time point in the current GOP. The delay is also related to other factors, for example, the normal delay of receiving, displaying and playing, speed of receiving the media streams, and processing of the media stream switching request.

After determining the media play delay, the server may send the media play delay serving as quick processing indication information to the first media receiving device.

202: According to the media play delay, the first media receiving device calculates a frame skip frequency for playing the media stream in a frame skip mode, and/or a fast forward speed for playing the media stream in fast forward mode, and/or the duration of decoding the media stream quickly.

After receiving the media play delay sent by the server, the first media receiving device calculates the frame skip frequency for playing the media stream in frame skip mode, and/or the fast forward speed for playing the media stream in fast forward mode, and/or the duration of decoding the media stream quickly according to the media play delay. For example, if the media play delay is 2 seconds, the normal play speed of the media streams is 30 frames per second, and the first media receiving device expects to catch up with the play speed of the second media receiving device within one minute, the first media receiving device calculates the lowest frame skip frequency as skipping one frame every 30 frames. That is, for a media stream normally finished within one second, the first media receiving device finishes playing it within only 29/30 seconds; for a media stream normally finished within 60 seconds, the first media receiving device finishes playing it within only 58 seconds. In this way, the "media play delay" may be offset within one minute. To catch up with the play progress of the second media receiving device, the first media receiving device applies a higher frame skip frequency, for example, skips one frame every 15 frames, which makes the play progress catch up with the play progress of the second media receiving device within 30 seconds. However, it should be noted that, a too high frame skip frequency may deteriorate the user experience. Therefore, the determination of frame skip frequency depends on actual conditions, and is not limited in the present invention.

The foregoing describes how the first media receiving device determines the frame skip frequency. In practice, the first media receiving device may calculate the fast forward speed and/or duration. For example, if the media play delay is 2 seconds, the normal play speed of the media stream is 30 frames per second, and the first media receiving device expects to catch up with the play progress of the second media receiving device within one minute, the first media receiving device calculates the lowest fast forward speed as "1+1/30" multiple. This calculated value indicates that, when the media stream is played in the fast forward mode, the first media receiving device plays one more frame every second, and plays 60 more frames in 60 seconds, which compensates the "media play delay" within one minute.

Likewise, if the media play delay is 2 seconds, the normal play speed of the media stream is 30 frames per second, and the decoding speed of the media stream is 60 frames per second, it is determined that the difference of play progress between the first media receiving device and the second media receiving device is 60 frames. In one second, the number of decoded frames of the media stream is greater than the number of played frames of the media stream by 30 frames. Therefore, the first media receiving device calculates the required duration of quick decoding as 2 seconds.

203: The first media receiving device plays the first media stream in a frame skip mode according to the frame skip frequency, and/or plays the first media stream in a fast forward mode at the fast forward speed, and/or decodes the first media stream quickly in the calculated duration.

After calculating the frame skip frequency for playing the media stream in the frame skip mode, and/or the fast forward speed for playing the media stream in the fast forward mode, and/or the duration of quick decoding, the first media receiving device may play the first media stream in the frame skip mode according to the frame skip frequency, and/or play the first media stream in the fast forward mode at the fast forward speed, and/or decode the first media stream quickly in the calculated duration.

It should be noted that, the first media receiving device may execute one or any combination of playing in the frame skip mode, playing in the fast forward mode, and quick decoding, which is not limited in the present invention.

After completion of playing the first media stream in the frame skip mode, and/or playing the first media stream in the fast forward mode, and/or decoding the first media stream quickly, the play progress of the first media receiving device is synchronous with the play progress of the second media receiving device, and the first media receiving device may play the second media stream at the normal speed.

It should be noted that, in this embodiment, the first media receiving device obtains the media play delay from the server, and then calculates the frame skip frequency for playing the media stream in the frame skip mode, and/or the fast forward speed for playing the media stream in the fast forward mode, and/or the duration of decoding the media stream quickly. That is, in this embodiment, the quick processing indication information is the media play delay sent by the server. It should be understood that, in practice, after determining the media play delay, the server may calculate the frame skip frequency for playing the media stream in the frame skip mode, and/or the fast forward speed for playing the media stream in the fast forward mode, and/or the duration of decoding the media stream quickly, and then the server sends the frame skip frequency for playing the media stream in the frame skip mode, and/or the fast forward speed for playing the media stream in the fast forward mode, and/or the duration of decoding the media stream quickly obtained by calculation as quick processing indication information to the first media receiving device.

Moreover, in practice, if the quick processing indication information is preset locally on the first media receiving device, the first media receiving device may obtain the preset quick processing indication information locally, for example, the frame skip frequency is to skip one frame every 15 frames by default, after joining the multicast group, and process the first media stream quickly according to the quick processing indication information.

In this embodiment, after joining the multicast group, the first media receiving device obtains the quick processing indication information, and processes the first media stream in the received media streams quickly according to the quick processing indication information so that the media play progress of the first media receiving device is synchronous with the media play progress of the second media receiving device in the same multicast group, where the second media receiving device is receiving multicast media streams. Therefore, after the first media receiving device joins the multicast group halfway, although the video buffer of the first media receiving device stores more data than the video buffer of other media receiving devices in the multicast group, the play progress of the first media receiving device may catch up with the play progress of other media receiving devices in the multicast group because the first media receiving device processes the surplus data quickly according to quick processing indication information. As a result, all the media receiving devices in the same multicast group play the real-time content synchronously, thereby improving the user experience.

In this embodiment, the first media receiving device may obtain the quick processing indication information in different ways, which improves flexibility of the media stream processing process.

Figure 4:
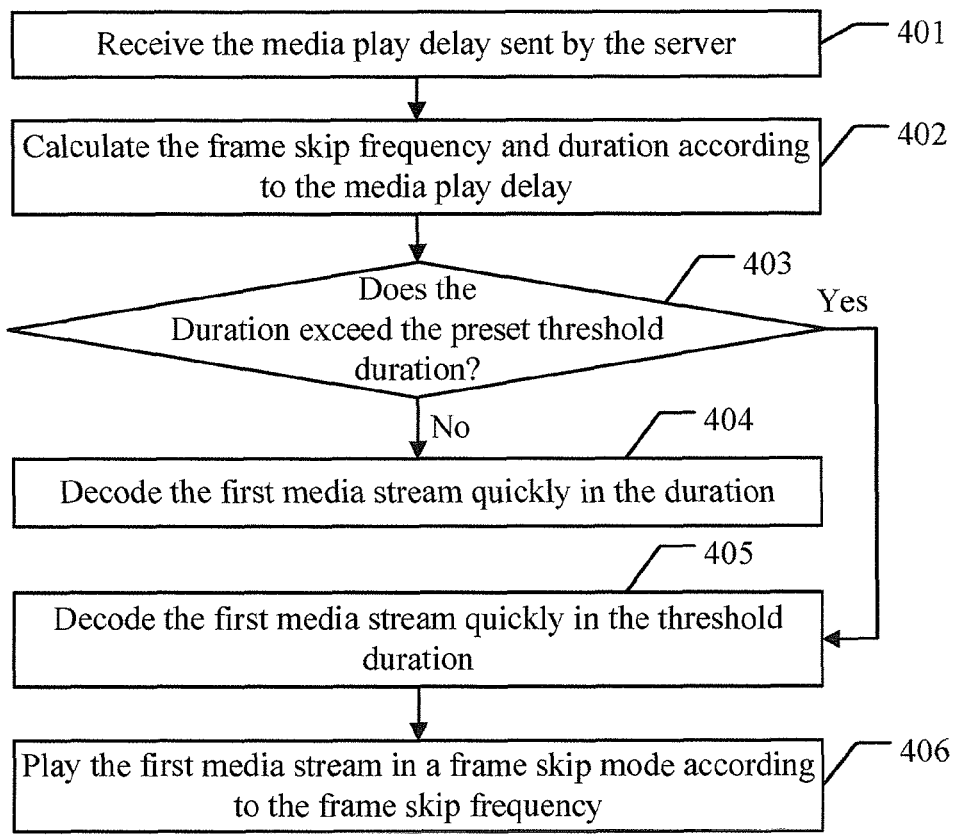
FIG. 4 is a schematic diagram of a media stream processing method according to another embodiment of the present invention.

Another embodiment is illustrated to further describe the media stream processing method. Referring to FIG. 4, another embodiment of the media stream processing method includes the following steps:

401: The first media receiving device receives a media play delay sent by a server.

In this embodiment, the first media receiving device receives the media play delay from the server in the same way as that in the embodiment shown in FIG. 2, which is not repeated herein.

402: The first media receiving device calculates a frame skip frequency and duration according to the media play delay.

After receiving the media play delay sent by the server, the first media receiving device calculates the frame skip frequency for playing the media stream in the frame skip mode, and the duration of decoding the media stream quickly according to the media play delay.

If the media play delay is 10 seconds, the normal play speed of the media stream is 30 frames per second, and the decoding speed of the media stream is 60 frames per second, it is determined that the difference of play progress between the first media receiving device and the second media receiving device is 300 frames. That is, in one second, the number of decoded frames of the media stream is greater than the number of played frames of the media stream by 30 frames. If the quick decoding scheme alone is applied, the duration of quick decoding is calculated as 10 seconds.

If the media play delay is 10 seconds, the normal play speed of the media streams is 30 frames per second, and the first media receiving device expects to catch up with the play speed of the second media receiving device within one minute, the first media receiving device calculates the lowest frame skip frequency as skipping one frame every 30 frames, assuming that the frame skip scheme alone is applied.

403: Judge whether the duration exceeds preset threshold duration, if the duration exceeds the preset threshold duration, proceed to step 405; if the duration does not exceed the preset threshold duration, proceed to step 404.

After determining the duration of quick decoding, it is judged whether the duration exceeds the preset threshold duration.

In the quick decoding, the first media receiving device is unable to play media streams to the user. The user cannot watch the media stream until the quick decoding is complete. To improve the user experience, the duration of quick decoding should be as short as possible. In practice, the threshold duration such as 5 seconds is preset, which indicates that the maximum duration of quick decoding is 5 seconds.

404: Decode the first media stream quickly in the duration.

If the duration of quick decoding does not exceed the preset threshold duration, the first media receiving device decodes the first media stream quickly in the duration of quick decoding. Upon completion of the quick decoding, the play progress is synchronized between the first media receiving device and the second media receiving device.

405: Decode the first media stream quickly in the threshold duration.

If the duration of quick decoding exceeds the preset threshold duration, the first media receiving device decodes the first media stream quickly in the threshold duration in order to ensure the user experience. Upon completion of the quick decoding, the play progress of the first media receiving device still lags behind the play progress of the second media receiving device.

406: Play the first media stream in the frame skip mode according to the frame skip frequency.

The play progress of the first media receiving device still lags behind the play progress of the second media receiving device after completion of decoding the first media stream quickly in the threshold duration, so the remaining part of the first media stream needs to be played in the frame skip mode. Therefore, the first media receiving device plays the media stream in the frame skip mode according to the preset frame skip frequency. Finally, the play progress of the first media receiving device is synchronous with the play progress of the second media receiving device.

It should be noted that, in this embodiment, the frame skip scheme combines with the quick decoding scheme to play the media stream. It should be understood that, in practice, the fast forward scheme may combine with the quick decoding scheme; or the frame skip scheme, the fast forward scheme and the quick decoding scheme are combined to play the media stream.

In this embodiment, after joining the multicast group, the first media receiving device obtains the quick processing indication information, and processes the first media stream in the received media streams quickly according to the quick processing indication information so that the media play progress of the first media receiving device is synchronous with the media play progress of the second media receiving device in the same multicast group, where the second media receiving device is receiving multicast media streams. Therefore, after the first media receiving device joins the multicast group halfway, although the video buffer of the first media receiving device stores more data than the video buffer of other media receiving devices in the multicast group, the play progress of the first media receiving device may catch up with the play progress of other media receiving devices in the multicast group because the first media receiving device processes the surplus data quickly according to quick processing indication information. As a result, all the media receiving devices in the same multicast group play the real-time content synchronously, thereby improving the user experience.

Further, in this embodiment, the first media receiving device may decode the first media stream quickly first; if the duration of the quick decoding exceeds the preset threshold duration, the first media receiving device goes on to process the remaining part of the first media stream in the frame skip mode, which ensures the user experience in watching the played content.

Figure 5:
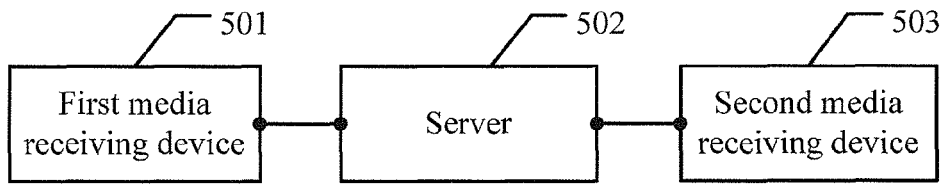
FIG. 5 is a schematic diagram of a communication system according to an embodiment of the present invention.

The following describes a communication system provided in an embodiment of the present invention. Referring to FIG. 5, the communication system according to an embodiment of the present invention includes:

a server 502, configured to provide media streams;

a first media receiving device 501, configured to: receive the media streams from the server 502, where the media streams include a first media stream and a second media stream; and process the first media stream quickly and play the second media stream normally so that media play progress of the first media receiving device 501 is synchronous with media play progress of a second media receiving device 503; and the second media receiving device 503, configured to receive multicast media streams.

The first media receiving device 501 and the second media receiving device 503 are located in the same multicast group.

Figure 6:
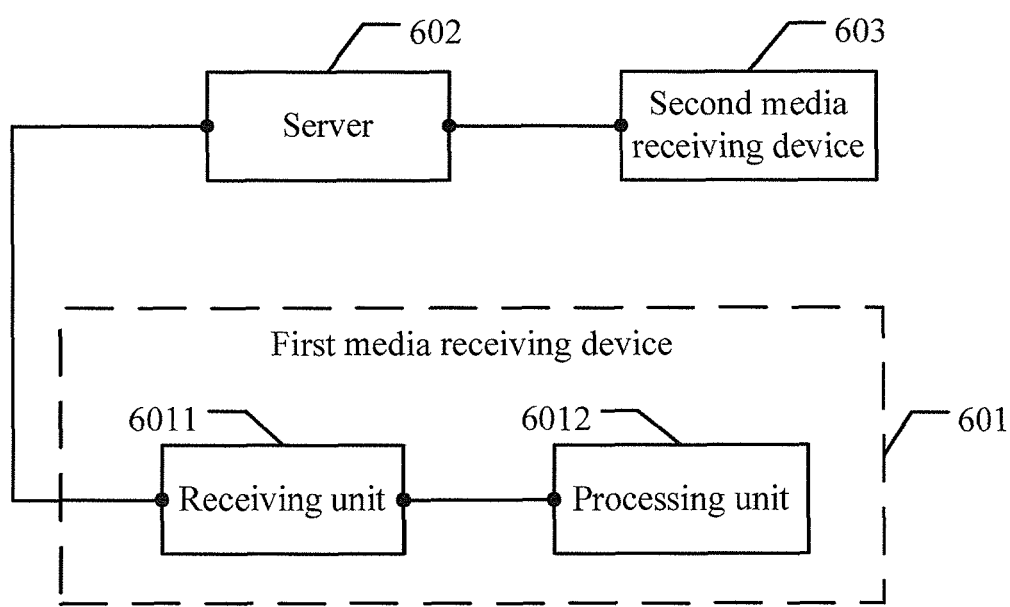
FIG. 6 is a schematic diagram of a communication system according to another embodiment of the present invention.

The following gives an instance of the communication system for ease of understanding. Referring to FIG. 6, a communication system provided in another embodiment of the present invention includes:

a server 602, configured to provide quick processing indication information and media streams;

a first media receiving device 601, configured to: obtain the quick processing indication information provided by the server 602, and process a first media stream in the received media streams quickly according to the quick processing indication information until media play progress of the first media receiving device 601 is synchronous with media play progress of a second media receiving device 603; and the second media receiving device 603, configured to receive multicast media streams.

The first media receiving device 601 and the second media receiving device 603 are located in the same multicast group.

In this embodiment, the first media receiving device 601 includes:

a receiving unit 6011, configured to receive media streams from the server, where the media streams include a first media stream and a second media stream; and a processing unit 6012, configured to process the first media stream quickly and play the second media stream normally so that media play progress of a first media receiving device is synchronous with media play progress of the second media receiving device.

The second media receiving device 603 is configured to receive the multicast media streams, and the first media receiving device 601 and the second media receiving device 603 are in the same multicast group.

For ease of understanding, a detailed application scenario is given below to describe a procedure of interactions between network elements in the communication system.

In this embodiment, when the first media receiving device 601 requests to join a multicast group, the time point when the first media receiving device 601 requests for joining may not be the time point of ending the intraframe-coded frame in the multicast media stream in the multicast group, and the first media receiving device 601 may be unable to start playing the media streams immediately. In order that the first media receiving device 601 may play media streams as soon as practicable, the server 602 sends media streams to the first media receiving device 601 from the intraframe-coded frame in the current GOP quickly. In this way, the first media receiving device 601 may start playing videos soon.

In this embodiment, the receiving unit 6011 in the first media receiving device 601 receives the media streams from the server 602. In practical application, the receiving unit 6011 in the first media receiving device 601 may receive the media streams from another network element such as an intermediate device, and the mode of receiving the media streams for the receiving unit 6011 of the first media receiving device 601 is not limited herein.

Upon completion of sending the media streams quickly, the server 602 may send the multicast media streams to the receiving unit 6011 in the first media receiving device 601 at the normal sending speed.

In this embodiment, the media streams sent by the server 602 to the receiving unit 6011 in the first media receiving device 601 may be regarded as two parts: the first media stream and the second media stream. The first media stream needs to be processed by the processing unit 6012 in the first media receiving device 601 quickly, and the second media stream needs to be played by the processing unit 6012 in the first media receiving device 601 normally.

The server 602 sends media streams to the first media receiving device 601 quickly, and therefore, in order to synchronize the play progress of the first media receiving device 601 with the play progress of the second media receiving device 603 in this multicast group as soon as practicable, the first media receiving device 601 may obtain quick processing indication information. In this embodiment, the quick processing indication information is obtained by the first media receiving device 601 from the server 602, and the quick processing indication information is a media play delay.

The media play delay is a frame difference or time difference between the following two time points: the time point when the server sends an intraframe-coded frame in a current GOP to the receiving unit 6011 in the first media receiving device 601, and the time point of sending the intraframe-coded frame in the current GOP in the multicast media streams; or the media play delay is the sum of the difference and inherent play delay. In practice, the intraframe-coded frame may be IDR frame.

After determining the media play delay, the server 602 may send the media play delay serving as quick processing indication information to the first media receiving device 601.

After receiving the media play delay sent by the server 602, the first media receiving device 601 calculates the frame skip frequency for playing the media stream in the frame skip mode, and the duration of decoding the media stream quickly according to the media play delay.

After determining the duration of quick decoding, the first media receiving device 601 judges whether the duration exceeds the preset threshold duration. In the quick decoding, the first media receiving device 601 is unable to play media streams to the user, and the user cannot watch the media stream until the quick decoding is complete. Therefore, in order to improve the user experience, the duration of quick decoding should be as short as possible. In practice, the threshold duration such as 5 seconds is preset, which indicates that the maximum duration of quick decoding is 5 seconds.

If the duration of quick decoding does not exceed the preset threshold duration, the first media receiving device 601 decodes the first media stream quickly in the duration of quick decoding directly. Upon completion of the quick decoding, the play progress is synchronized between the first media receiving device 601 and the second media receiving device 603.

If the duration of quick decoding exceeds the preset threshold duration, the first media receiving device 601 decodes the first media stream quickly in the threshold duration in order to ensure the user experience. Upon completion of the quick decoding, the play progress of the first media receiving device 601 still lags behind the play progress of the second media receiving device 603.

The play progress of the first media receiving device 601 still lags behind the play progress of the second media receiving device 603 after completion of decoding the first media stream quickly in the threshold duration, so the remaining part of the first media stream needs to be played in frame skip mode. Therefore, the first media receiving device 601 plays the media stream in the frame skip mode according to the preset frame skip frequency. Finally, the play progress of the first media receiving device 601 is synchronous with the play progress of the second media receiving device 603.

It should be noted that, in this embodiment, the frame skip scheme combines with the quick decoding scheme to play the media stream. In practical application, the fast forward scheme may combine with the quick decoding scheme; or the frame skip scheme, the fast forward scheme and the quick decoding scheme are combined to play the media stream.

In this embodiment, after joining the multicast group, the first media receiving device 601 obtains the quick processing indication information, and processes the first media stream in the received media streams quickly according to the quick processing indication information so that the media play progress of the first media receiving device 601 is synchronous with the media play progress of the second media receiving device 603 in the same multicast group, where the second media receiving device is receiving multicast media streams. Therefore, after the first media receiving device 601 joins the multicast group halfway, although the video buffer of the first media receiving device 601 stores more data than the video buffer of other media receiving devices in the multicast group, the play progress of the first media receiving device 601 may catch up with the play progress of other media receiving devices in the multicast group because the first media receiving device 601 processes the surplus data quickly according to quick processing indication information. As a result, all the media receiving devices in the same multicast group play the real-time content synchronously, thereby improving the user experience.

Figure 7:
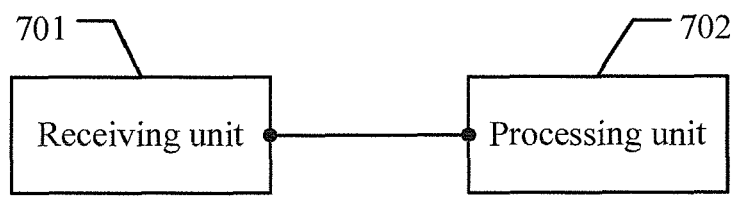
FIG. 7 is a schematic diagram of a media receiving device according to an embodiment of the present invention.

The following describes a media receiving device provided in an embodiment of the present invention. Referring to FIG. 7, the media receiving device according to an embodiment of the present invention includes:

a receiving unit 701, configured to receive media streams from the server, where the media streams include a first media stream and a second media stream; and a processing unit 702, configured to process the first media stream quickly and play the second media stream normally so that media play progress of itself is synchronous with media play progress of a second media receiving device.

The second media receiving device is configured to receive the multicast media streams, and the media receiving device and the second media receiving device are in the same multicast group.

Figure 8:
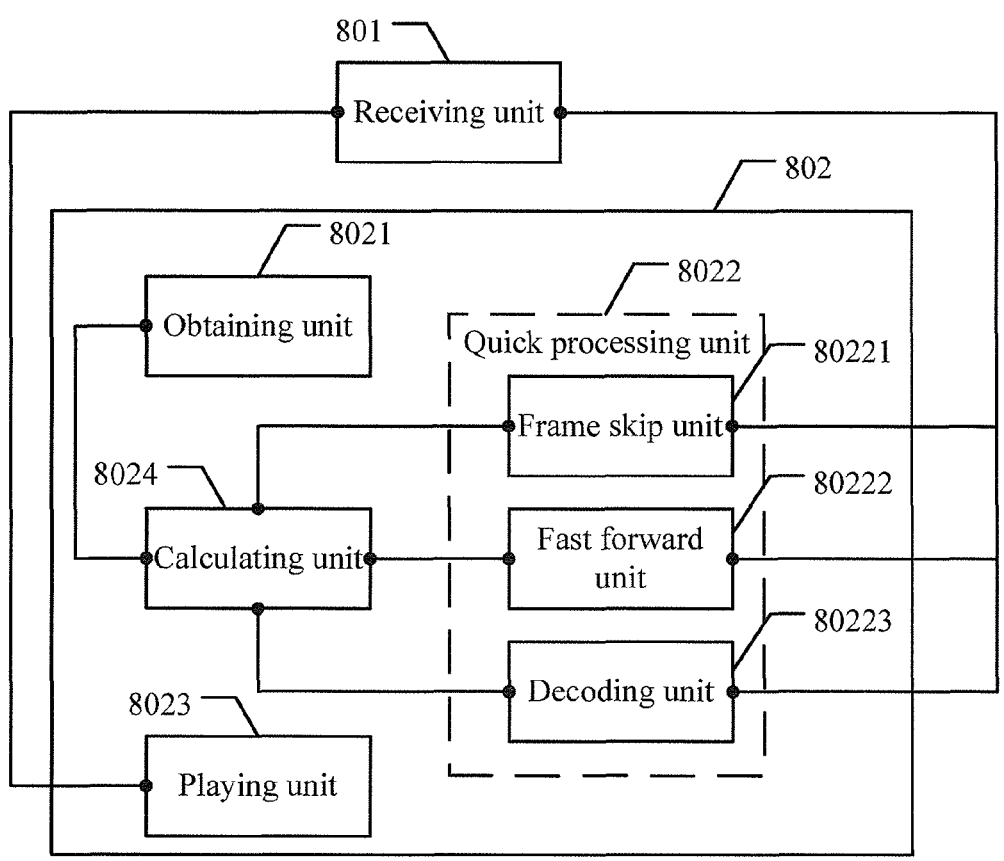
FIG. 8 is a schematic diagram of a media receiving device according to another embodiment of the present invention.

The following gives an instance of the media receiving device for ease of understanding. Referring to FIG. 8, a media receiving device provided in another embodiment of the present invention includes:

a receiving unit 801, configured to receive media streams from the server, where the media streams include a first media stream and a second media stream; and a processing unit 802, configured to process the first media stream quickly and play the second media stream normally so that media play progress of the itself is synchronous with media play progress of a second media receiving device.

The second media receiving device is configured to receive the multicast media streams, and the media receiving device and the second media receiving device are in the same multicast group.

The processing unit 802 in this embodiment includes:

an obtaining unit 8021, configured to obtain quick processing indication information;

a quick processing unit 8022, configured to process the first media stream quickly according to the quick processing indication information; and a playing unit 8023, configured to play the second media stream normally.

The quick processing indication information obtained by the obtaining unit 8021 in this embodiment is provided by the server, or is preset locally on the media receiving device.

The quick processing indication information includes: frame skip frequency for playing the media stream in the frame skip mode, and/or fast forward speed for playing the media stream in the fast forward mode, and/or duration of decoding the media stream quickly.

Or, the quick processing indication information in this embodiment is a media play delay, and the media play delay is a frame difference or time difference between the following two time points: the time point when the server sends an IDR frame in the current GOP to the first media receiving device, and the time of sending the IDR frame in the current GOP in the multicast media streams; or the media play delay is the sum of the difference and inherent play delay.

The processing unit 802 in this embodiment further includes:

a calculating unit 8024, configured to calculate the frame skip frequency for playing the media stream in the frame skip mode, and/or the fast forward speed for playing the media stream in the fast forward mode, and/or the duration of decoding the media stream quickly according to the media play delay.

The quick processing unit 8022 in this embodiment includes at least one of the following units:

a frame skip unit 80221, configured to play the media stream in the frame skip mode according to the frame skip frequency;

a fast forward unit 80222, configured to play the media stream in the fast forward mode at the fast forward speed; and a decoding unit 80223, configured to decode the media stream quickly in the duration.

The media receiving device in this embodiment may serve as a first media receiving device in the foregoing method embodiments. For ease of understanding, the following gives an application scenario to describe the media receiving device in this embodiment:

In this embodiment, when the media receiving device requests to join a multicast group, the obtaining unit 8021 in the media receiving device may obtain quick processing indication information. In this embodiment, the quick processing indication information is obtained by the media receiving device from the server, and the quick processing indication information is a media play delay.

After the obtaining unit 8021 receives the media play delay sent by the server, the calculating unit 8024 calculates the frame skip frequency for playing the media stream in the frame skip mode, and/or the fast forward speed for playing the media stream in the fast forward mode, and/or the duration of decoding the media stream quickly according to the media play delay.

After the calculating unit 8024 calculates the frame skip frequency for playing the media stream in the frame skip mode, and/or the fast forward speed for playing the media stream in the fast forward mode, and/or the duration of quick decoding, the quick processing unit 8022 plays the first media stream in the frame skip mode according to the frame skip frequency, and/or play the first media stream in the fast forward mode at the fast forward speed, and/or decode the first media stream quickly in the calculated duration.

Specifically, the frame skip unit 80221 in the quick processing unit 8022 plays the first media stream in the frame skip mode according to the frame skip frequency, and/or the fast forward unit 80222 plays the first media stream in the fast forward mode at the fast forward speed, and/or the decoding unit 80223 decodes the first media stream quickly in the calculated duration.

It should be noted that, the media receiving device may execute one or any combination of playing in frame skip mode, playing in fast forward mode, and quick decoding, which is not limited in the present invention.

After the media receiving device finishes playing the media stream in the frame skip mode, and/or playing the media stream in the fast forward mode, and/or decoding the media stream quickly, the play progress of the media receiving device is synchronous with the play progress of other media receiving devices in the multicast group, and the media receiving device may play the media stream at the normal playing speed.

In this embodiment, after the media receiving device joins the multicast group, the obtaining unit 8021 obtains the quick processing indication information, and the quick processing unit 8022 processes the first media stream in the received media streams quickly according to the quick processing indication information until media play progress of the media receiving device is synchronous with media play progress of other media receiving devices that receive the multicast media stream in the multicast group. In this way, the real-time content played by the media receiving devices in the same multicast group is synchronized, thereby improving the user experience.

Persons of ordinary skill in the art should understand that all or a part of the steps of the method in the embodiments of the present invention may be implemented by a program instructing relevant hardware. The program may be stored in computer readable storage media. The storage media may be a Read Only Memory (ROM), a magnetic disk, or an optical disk.

A media stream processing method, a communication system, and the relevant device provided in the present invention are described in detail above. Persons of ordinary skill in the art can make variations and modifications to the present invention in terms of the specific implementations and application scopes according to the ideas of the present invention. Therefore, the specification shall not be construed as a limit to the present invention.

What is claimed is:

1. A media stream processing method, comprising:

receiving, by a first media receiving device, media streams, wherein the media streams comprise a first media stream and a second media stream;

obtaining, by the first media receiving device, quick processing indication information, wherein the quick processing indication information is a media play delay, and the media play delay is a frame difference or time difference between the following two time points: a time point of sending an intraframe-coded frame in a current Group of Pictures (GOP) to the first media receiving device, and a time point of sending intraframe-coded frame in the current GOP in multicast media streams, or the media play delay is a sum of the difference and an inherent play delay;

calculating, by the first media receiving device, at least one of a frame skip frequency for playing the media stream in a frame skip mode, a fast forward speed for playing the media stream in a fast forward mode, and duration of decoding the media stream quickly according to the media play delay;

processing, by the first media receiving device, the first media stream quickly according to the calculated result; and playing the second media stream normally so that media play progress of the first media receiving device is synchronous with media play progress of a second media receiving device, wherein the second media receiving device is configured to receive multicast media streams, and the first media receiving device and the second media receiving device are in the same multicast group.

2. The method according to claim 1, wherein the processing, by the first media receiving device, the first media stream quickly according to the calculated result comprises at least one of:
playing, by the first media receiving device, the first media stream in the frame skip mode according to the frame skip frequency:
playing, by the first media receiving device, the first media stream in the fast forward mode according to the a fast forward speed;
decoding, by the first media receiving device, the first media stream quickly according to the duration.

3. The method according to claim 1, wherein the
the processing, by the first media receiving device, the first media stream quickly according to the calculated result comprises:
judging whether the duration of quick decoding exceeds preset threshold duration, if the duration of quick decoding exceeds the preset threshold duration, decoding the first media stream quickly within the threshold duration, and playing the first media stream in the frame skip mode according to the frame skip frequency or playing the media stream in the fast forward mode at the fast forward speed after the threshold duration;
if the duration of quick decoding does not exceed the preset threshold duration, decoding the first media stream quickly within the duration of quick decoding.

4. The method according to claim 1, wherein the first media stream comprises at least one of a quickly sent media stream and a normally sent multicast media stream, and the quickly sent media stream is quickly sent in a unicast mode or a multicast mode.

5. A communication system, comprising:
a server, configured to provide media streams;
a first media receiving device, configured to: receive the media streams from the server, wherein the media streams comprise a first media stream and a second media stream; obtain quick processing indication information, wherein the quick processing indication information is a media play delay, and the media play delay is a frame difference or time difference between the following two time points: a time point of sending intraframe-coded frame in a current Group of Pictures (GOP) to the media receiving device, and a time point of sending intraframe-coded frame in the current GOP in multicast media streams; or the media play delay is a sum of the difference and an inherent play delay; calculating, by the first media receiving device, at least one of a frame skip frequency for playing the media stream in a frame skip mode, a fast forward speed for playing the media stream in a fast forward mode, and duration of decoding the media stream quickly according to the media play delay; process the first media stream quickly according to the calculated result and play the second media stream normally so that media play progress of the first media receiving device is synchronous with media play progress of a second media receiving device; and
the second media receiving device, configured to receive multicast media streams, wherein
the first media receiving device and the second media receiving device are located in the same multicast group.

6. A media receiving device, comprising:
a receiving unit, configured to receive media streams, wherein the media streams comprise a first media stream and a second media stream; and
a processing unit, configured to process the first media stream quickly and play the second media stream normally so that media play progress of itself is synchronous with media play progress of a second media receiving device, wherein
the second media receiving device is configured to receive multicast media streams, and the media receiving device and the second media receiving device are located in the same multicast group;
wherein the processing unit comprises:
an obtaining unit, configured to obtain quick processing indication information, wherein the quick processing indication information is a media play delay, and the media play delay is a frame difference or time difference between the following two time points: a time point of sending intraframe-coded frame in a current Group of Pictures (GOP) to the media receiving device, and a time point of sending intraframe-coded frame in the current GOP in multicast media streams; or the media play delay is a sum of the difference and an inherent play delay;
a calculating unit, configured to calculate at least one of a frame skip frequency for playing the media stream in the frame skip mode, a fast forward speed for playing the media stream in the fast forward mode, and duration of decoding the media stream quickly according to the media play delay;
a quick processing unit, configured to process the first media stream quickly according to the calculated result; and
a playing unit, configured to play the second media stream normally.

7. The media receiving device according to claim 6, wherein the quick processing indication information obtained by the obtaining unit is provided by an external device or is preset locally on the media receiving device.

8. The media receiving device according to claim 7, wherein the quick processing unit comprises at least one of the following units:
a frame skip unit, configured to play the first media stream in the frame skip mode according to the frame skip frequency;
a fast forward unit, configured to play the first media stream in the fast forward mode at the fast forward speed; and
a decoding unit, configured to decode the first media stream quickly in the duration.

* * * * *